United States Patent Office 3,262,789
Patented July 26, 1966

3,262,789
METHOD FOR RELEASING STOCKINETS FROM SMOKED MEAT PRODUCTS
Hormoz K. F. Broumand and Joseph J. Weber, Indianapolis, Ind., assignors to North American Laboratory Company, Inc., Indianapolis, Ind., a corporation of Indiana
No Drawing. Filed Aug. 24, 1964, Ser. No. 391,749
2 Claims. (Cl. 99—229)

This invention relates to a composition and method for the treatment of stockinets in which food products are placed for heat treatment and/or smoking so as to make it possible for the stockinets to be more readily removed from the product.

The procedure presently being used for the smoking of meat and some poultry and seafood products is to place the food products in stockinets and hang them in a smokehouse for smoking. Almost invariably after the product is smoked it is very difficult to remove the stockinet. The problem becomes particularly difficult where products have been smoked in containers where pressure is being applied, such as those which are smoked while pressed between screens or grills. During the smoking of meats, such as hams and the like, the threads of the stockinets become imbedded in the surface of the meat and form a crust which adheres very strongly to such surface. Separation of the stockinet from the meat causes tearing of the surface tissue and scarring of the product which is undesirable. Thus, substantial loss of salable products is incurred.

An object of the present invention is to provide for the more facile removal of stockinets from heated and/or smoked food products which have been placed in the stockinets for processing.

Another object of the invention is to provide a composition for treatment of the threads and fibers of stockinets and/or for treatment of the surface of food products on which the stockinets are to be placed so as to prevent sticking of the stockinets to the product.

A further object of the invention is to provide a means whereby stockinets may be maintained in soft, pliable condition during smoking or heating processes.

It has previously been suggested to apply an oil or fat to stockinets in an effort to prevent them from sticking to meat products. However, the oil tends to cling to the surface of the stockinets, making them greasy and messy to handle and does not entirely solve the release problem because the oil has not saturated the pores of the fibers.

It has now been discovered that an emulsion of oil and water containing a suitable edible emulsifying agent will quickly and easily soak into and penetrate the stockinet fibers, the resulting treated stockinets are not greasy, are easy to handle and peel away from the smoked or heated products without damage to the product surface. The compositions of the invention tend to saturate or affect the fibers of the stockinet to the point where the juices, curing solutions, fats or drippings from the smoked meats or other products do not adhere to them to form a crust, nor do the fibers tend to dry out and break upon attempted removal from the product. The emulsifying agent has the combined functions of facilitating incorporation of the emulsion into the capillary openings of the fibers, cooperating with the oil to prevent adhesion of the fibers to the product and to keep the fibers soft and flexible, and assisting in the release of the stockinet from the product. The treated fibers remain relatively soft and flexible throughout the cooking and smoking operations and are easily pulled off in one piece from the product.

The stockinet releasing compositions of the invention comprise an edible oil, a substantial amount of water and a minor proportion of an edible emulsifier. While the proportions of these ingredients are not sharply critical, in general, the amount of oil will be in the order of about 10 to 50% by weight of the composition, the amount of water about 90 to 50% by weight and the emulsifier about 0.1 to 5% by weight. The emulsion may be either an oil-in-water or water-in-oil dispersion. Both oil-soluble and water-soluble types of emulsifying agents may be employed. The emulsifier may be dispersed in the oil and the resulting composition mixed with the water to form the emulsion, or alternatively, may be first dispersed in the water and the resulting composition emulsified with oil. It is also possible to mix all three ingredients at the same time as by running them together through a mixing valve or into a high speed mixer.

The edible oil may be of either vegetable or animal origin. The usual cooking oils of commerce such as corn oil, cottonseed oil, peanut oil, soybean and sesame are quite satisfactory, but it will be understood that the invention is not limited to the use of a particular oil.

Any of the emulsifying agents which have been found acceptable in food use may be employed. Examples of these are lecithin, lecithin derivatives and partial esters of glycerol, sorbitol, polyglycerols and their derivatives. The polyoxyethylene ethers of partial long chain fatty acid esters of sorbitol anhydrides, e.g., products marketed under the trade name "Tween" are quite useful. Mono- and diglycerides, such as glycerol monostearate and glycerol diolein may also be used. Other useful emulsifiers are the hydrophilic colloids such as alginates, methyl, cellulose and its derivatives, vegetable gums, etc. Combinations of the various food emulsifying agents are also within the scope of the invention.

A very useful preparation is a premix of the emulsifying agent in the oil. Such preparation may be shipped to food processing plants for admixture with water at the point of use. A composition of this type comprises an edible oil having from about 1% to about 25% by weight of an edible emulsifying agent intimately dispersed or solubilized therein. A preferred composition of this type is made by mixing a liquid vegetable oil with a fluid lecithin. Fluid lecithin products are commercially available to the food industry, an example being soya lecithin in which the naturally occurring oils have been removed by extraction with acetone or other oil solvent. The fluid lecithin is readily dispersible in vegetable oils. Any settling of the dispersion in storage is quickly remedied by shaking the container. This composition mixes readily with water without the use of special mixing equipment. While relatively wide variations in the proportions of the mixture are permissible, an especially desirable mixture contains approximately 1 part by weight fluid lecithin, 7 parts by weight of edible oil and 28 parts by weight of water.

The invention is further illustrated by the following examples.

*Example 1*

Seven parts by weight of corn oil and one part by weight of fluid food grade lecithin are mixed by passage through a mixing valve. The resulting composition is placed in containers and transferred to a meat packing plant. At a plant the containers are given a precautionary shake and the contents are added to water in a soaking vat at the rate of about one gallon of the oil emulsifying dispersion to four gallons of water. The mixture is stirred with an agitator and forms an emulsion which remains stable for a substantial length of time, e.g., at least 24 hours. Ham stockinets are placed in the emulsion in the vat for a period of about 15 minutes or longer, following which they are run through a wringer to remove any excess emulsion. The stockinets, which are moist, but not greasy, are used to bag hams for smoking. After the smoking operation, the stockinets are readily removed without damage to the surface of the hams.

*Example 2*

Hams prepared for smoking are sprayed or dipped in a mixture of the stockinet releasing preparation, prepared as in Example 1 and are then placed in stockinets. Improvements in the release of the stockinets after the smoking operation are realized, but the improvement is not as maked as in the procedure of Example 1. Alternatively or additionally, the stockineted hams are dipped or sprayed with the releasing agent.

*Example 3*

Polyoxyethylene sorbitan mono-oleate (Tween 80) is mixed with water in a high speed mixer in the proportion of about 1% by weight with respect to the water and immediately goes into solution. Corn oil is added to the solution in the proportion of about 10% by weight with respect to the water and mixing is continued. The resulting emulsion is used to treat stockinets in the manner set forth in Example 1.

Alternately, the polyoxyethylene sorbitan mono-oleate may be first dispersed in the oil, in which it is quite soluble, to form a solution with which the water is subsequently mixed.

The process of treating the stockinets with the emulsions of the invention as set forth in the examples may be conducted at room temperature or the solutions may be warmed if desired. The advantages of the invention reside in part in the fact that special conditions are unnecessary either for mixing of the emulsions or in their application.

We claim:

1. A method for facilitating the release of stockinets from smoked meat products comprising soaking said stockinets prior to the smoking operation in an emulsion containing from about 10% to 50% by weight of a liquid edible oil, about 90% to 50% by weight of water and about 0.1% to 5% by weight of an edible emulsifying agent to thereby incorporate said emulsion into the capillary openings of the stockinet fibers whereby said fibers remain relatively soft and flexible throughout the smoking operation.

2. A method for facilitating the release of stockinets from meat products comprising soaking said stockinets in an emulsion of about one part by volume of a liquid edible oil, containing from about 1.0% to about 25% by weight of lecithin, and about 4 parts by volume of water to thereby incorporate said emulsion into the capillary openings of the stockinet fibers whereby said fibers remain relatively soft and flexible throughout the smoking operation.

References Cited by the Examiner

UNITED STATES PATENTS

| | | | |
|---|---|---|---|
| 1,790,698 | 2/1931 | Covey | 99—229 |
| 2,018,781 | 10/1935 | Gehrke | 99—15 |
| 2,161,029 | 6/1939 | Eckrich et al. | 99—169 X |
| 2,508,393 | 5/1950 | Jaeger | 99—123 |
| 2,982,660 | 5/1961 | Brissey et al. | 99—229 X |
| 3,010,830 | 11/1961 | Berndt et al. | 99—123 |

FOREIGN PATENTS 539,049  8/1941  Great Britain.

A. LOUIS MONACELL, *Primary Examiner.*

HYMAND LORD, *Examiner.*